United States Patent
Ko et al.

(10) Patent No.: US 10,029,238 B2
(45) Date of Patent: Jul. 24, 2018

(54) SELECTIVE SURFACE IMPREGNATION METHOD FOR CATALYTICALLY ACTIVE MATERIALS ON PARTICULATE CATALYST SUPPORT USING MUTUAL REPULSIVE FORCE AND SOLUBILITY DIFFERENCE BETWEEN HYDROPHILIC SOLVENT AND HYDROPHOBIC SOLVENT

(71) Applicant: INDUSTRY FOUNDATION OF CHONNAM NATIONAL UNIVERSITY, Gwangju (KR)

(72) Inventors: Chang Hyun Ko, Daejeon (KR); Gyeong Ju Seo, Naju-si (KR); Min Su Jang, Gwangju (KR); Seong Mi Ahn, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 15/343,360

(22) Filed: Nov. 4, 2016

(65) Prior Publication Data

US 2017/0072385 A1    Mar. 16, 2017

Related U.S. Application Data

(62) Division of application No. 14/466,984, filed on Aug. 23, 2014.

(30) Foreign Application Priority Data

Oct. 8, 2013 (KR) .................. 10-2013-0119695
May 14, 2014 (KR) .................. 10-2014-0058041

(51) Int. Cl.
    *B01J 23/48*    (2006.01)
    *B01J 23/50*    (2006.01)
    (Continued)

(52) U.S. Cl.
    CPC .............. *B01J 23/75* (2013.01); *B01J 21/04* (2013.01); *B01J 35/008* (2013.01); *B01J 35/02* (2013.01);
    (Continued)

(58) Field of Classification Search
    CPC . B01J 23/75; B01J 37/341; B01J 35/08; B01J 35/02; B01J 37/343; B01J 35/008; B01J 37/0207; B01J 37/0203; B01J 21/04
    (Continued)

(56) References Cited

U.S. PATENT DOCUMENTS

6,387,258 B1 *  5/2002  Keri .................... C07D 309/30
                                                    210/198.2
7,553,474 B2 *  6/2009  Ohmori ............... B01J 13/0047
                                                    423/100
(Continued)

FOREIGN PATENT DOCUMENTS

JP    2009-178644 A       8/2009
JP    2009178644 A    *  8/2009
(Continued)

OTHER PUBLICATIONS

Machine Translation of JP2009178644—Aug. 13, 2009.*

*Primary Examiner* — Haytham Soliman
(74) *Attorney, Agent, or Firm* — LRK Patent Law Firm

(57) ABSTRACT

A method for preparing a catalyst having catalytically active materials selectively impregnated or supported only in the surface region of the catalyst particle using the mutual repulsive force of a hydrophobic solution and a hydrophilic solution and the solubility difference to a metal salt precursor between the hydrophobic and hydrophilic solutions. The hydrophobic solvent is a C2-C6 alcohol. The hydrophobic solvent is introduced into the catalyst support and then removed of a part of the pores connected to the outer part of (Continued)

the catalyst particle by drying under appropriate conditions. Then, a hydrophilic solution containing a metal salt is introduced to occupy the void spaces removed of the hydrophobic solvent, and the catalyst particle is dried at a low rate to selectively support or impregnate the catalytically active material or the precursor of the catalytically active material only in the outer part of the catalyst particle.

6 Claims, 10 Drawing Sheets

(51) Int. Cl.
    *B01J 23/75*    (2006.01)
    *B01J 21/04*    (2006.01)
    *B01J 37/34*    (2006.01)
    *B01J 35/00*    (2006.01)
    *B01J 37/02*    (2006.01)
    *B01J 35/02*    (2006.01)
    *B01J 35/08*    (2006.01)

(52) U.S. Cl.
    CPC ........... *B01J 35/08* (2013.01); *B01J 37/0203* (2013.01); *B01J 37/0207* (2013.01); *B01J 37/341* (2013.01); *B01J 37/343* (2013.01)

(58) Field of Classification Search
    USPC ............................................... 502/347
    See application file for complete search history.

(56) References Cited

U.S. PATENT DOCUMENTS

| | | |
|---|---|---|
| 2003/0036476 A1 | 2/2003 | Arnold et al. |
| 2006/0153765 A1 | 7/2006 | Pham-Huu et al. |
| 2011/0275856 A1 | 11/2011 | Karpov et al. |
| 2012/0149559 A1 | 6/2012 | Wolan et al. |
| 2012/0316055 A1* | 12/2012 | Kubo ................... B01J 23/468 502/10 |

FOREIGN PATENT DOCUMENTS

| | | | |
|---|---|---|---|
| KR | 10-0550998 B1 | 2/2006 | |
| KR | 10-0846478 B1 | 7/2008 | |
| KR | 10-2010-0011687 A | 2/2010 | |
| KR | 10-0996336 B1 | 11/2010 | |
| WO | WO 2011122603 A1 * | 10/2011 | ............. B01J 23/02 |

* cited by examiner

| | | |
|---|---|---|
| comparative example (a) |  |  |
| comparative example (b) |  |  |
| example 1 (c) |  |  |
| example 2 (d) |  |  |
| example 3 (e) |  |  |
| example 4 (f) |  |  |

FIG. 4

| | | |
|---|---|---|
| example 5-1 (a) | | |
| example 5-2 (b) | | |
| example 5-3 (c) | | |
| example 5-4 (d) | | |
| example 5-5 (e) | | |
| example 5-6 (f) | | |
| example 5-7 (g) | | |
| example 5-9 (h) | | |

1min  5min  10min  20min  30min  60min  90min

1min  5min  10min  20min  30min  60min

SELECTIVE SURFACE IMPREGNATION METHOD FOR CATALYTICALLY ACTIVE MATERIALS ON PARTICULATE CATALYST SUPPORT USING MUTUAL REPULSIVE FORCE AND SOLUBILITY DIFFERENCE BETWEEN HYDROPHILIC SOLVENT AND HYDROPHOBIC SOLVENT

CROSS-REFERENCE TO RELATED APPLICATION(S)

This application is a division of U.S. patent application Ser. No. 14/466,984, filed Aug. 23, 2014, which claims priority to Korean Patent Application Nos. 10-2013-0119695, filed Oct. 8, 2013, and 10-2014-0058041, filed May 14, 2014, the disclosures of which are incorporated in their entireties herein by reference.

BACKGROUND OF THE INVENTION

1. Technical Field

The present invention relates to a method for supporting or impregnating catalytically active materials selectively on the surface of a spherical or cylindrical particulate catalyst support or in an outer pore region connected to the surface of the spherical or cylindrical particulate catalyst support using the mutual repulsive force and the solubility difference between a hydrophilic solvent and a hydrophobic solvent that are immiscible.

The present invention relates to a method for effectively reducing the production cost of a catalyst by optimizing the used amount of a noble metal to be supported or impregnated in a porous catalyst support in the fabrication process of the catalyst and, more particularly, to a fabrication method for a catalyst that involves supporting or impregnating an expensive metal or catalytically active ingredients selectively only on the surface of a porous catalyst support or in the pores in the vicinity of the surface of the porous catalyst support, thereby preventing the metal or catalytically active ingredients from being supported or impregnated in the pores in the vicinity of the center of the catalyst support that hardly participates in the catalytic reaction and thus reducing a wasteful use of the expensive metal or catalytically active ingredients.

More specifically, the present invention relates to a method for supporting or impregnating catalytically active materials selectively only on the surface of a catalyst support or in a region in the vicinity of the surface of the catalyst support having a micro-pore structure where the catalytic reaction mostly takes place, by applying a hydrophobic solvent and a hydrophilic solvent in sequence to the microporous catalyst support and thereby using the mutual repulsive force and the immiscibility of the hydrophobic solvent and the hydrophilic solvent. The catalyst support used in the present invention may be a spherical or cylindrical particulate catalyst support, a cylindrical particulate catalyst support with hollow pores inside the catalyst particle, or the like.

2. Description of the Related Art

In general, the catalytic reaction takes place only on the surface of catalyst particles other than inside the catalyst particles in the case of a reaction performed under the conditions involving a high space velocity, such as steam methane reforming reaction, water-gas shift reaction, and so forth. Further, in the Fischer-Tropsch reaction using catalyst particles having a particle size of 1 to 3 mm, the pore diffusion into the catalyst support is restricted in the catalyst using catalytically active materials such as cobalt (Co) or iron (Fe) supported or impregnated on the catalyst support. This can lower the production rate and the selectivity of a hydrocarbon having at least 5 carbon atoms. Therefore, the catalytically active material, if supported in the inner part of the catalyst particles in the form of pellets, possibly causes the side reactions or does not participate in the desired catalytic reaction, ending up with deterioration in the efficiency of the catalyst.

To overcome this problem, many researchers have consistently studied and proposed a method for fabricating a catalyst that involves supporting or impregnating catalytically active materials selectively only on the surface of a formulated catalyst support, and a catalyst prepared by the fabrication method.

Korean Laid-open Patent No. 2010-0011687 discloses a method of preparing a catalyst for a catalytic reforming of carbon dioxide into methane and a reforming method using the catalyst, where the method includes the steps of immersing a silica microspore molecular sieve catalyst support in an aqueous solution of nickel nitrate, performing a drying and calcination process to complete a main catalyst, secondly immersing the catalyst into an aqueous solution of additives and then performing a second drying and calcination process to complete a final form of catalyst. This method is characterized by forming a main catalyst and additives in sequence on a single catalyst support but involves separately performing the drying and calcination process for each catalyst-forming step. This can raise the production cost of the catalyst and render the catalytically active materials still hard to support or impregnate selectively in the vicinity of the surface of the catalyst support.

Korean Patent No. 550998 suggests an electrode for fuel cell and a fuel cell system including the same, where the electrode for fuel cell includes a catalyst layer including a platinum black or platinum-transition metal alloy black catalyst having an average particle diameter of 1 to 5 nm and an electrode support including a conductive substrate.

U.S. Laid-open Patent No. 2011-0275856 discloses a cylindrical catalyst support for providing an improved ring-shaped eggshell catalyst having a shell of a catalytic oxide material applied to the outer surface, an eggshell applied to the outer surface of the catalyst support, and a preparation method for the same. In addition, U.S. Laid-open Patent No. 2003-0036476 relates to a coated catalyst having a core and at least one shell surrounding the core, a preparation method for the same, and a use of the coated catalyst and proposes a method for preparing a shell catalyst that is provided in the form of a shell attached to the surface of a cylindrical or spherical core.

However, these documents of the prior art still have some problems concerning the needs for some improvement for the sake of effective reduction of the production cost, such as an increase in the efficiency of the catalyst manufacturing process and the catalytic reaction.

PRIOR DOCUMENTS

Patent Documents (Patent Document 1)
Korean Laid-Open Patent No. 2010-0011687 (laid open on Feb. 3, 2010)
(Patent Document 2)
Korean Registration Patent No. 550998 (published on Feb. 13, 2006)

(Patent Document 3)
U.S. Laid-Open Patent No. 2011-0275856 (laid open on Nov. 10, 2011)
(Patent Document 4)
U.S. Laid-Open Patent No. 2003-0036476 (laid open on Feb. 20, 2003)

SUMMARY OF THE INVENTION

The present invention is directed to a method of reducing a wasteful use of a catalytically active material that is an expensive noble metal in the preparation of a catalyst particle by supporting or impregnating catalytically active materials selectively only on the surface of a particulate porous catalyst support having a spherical or cylindrical structure and or in a region in the vicinity of the surface of the particulate porous catalyst support and preventing the expensive catalytically active materials from being supported or impregnated in the inner pores formed in the vicinity of the center of the catalyst support that hardly participates in the catalytic reaction.

The present invention is also directed to a method for supporting or impregnating analytically active materials selectively only on the surface of a catalyst support and in a region in the vicinity of the surface of the catalyst support where the catalytic reaction mostly takes place, by adding a hydrophobic solvent and a hydrophilic solvent in sequence into the catalyst support having a micro-porous structure and thus using the immiscibility of the hydrophobic and hydrophilic solvents caused by the mutual repulsive force between the hydrophobic and hydrophilic solvents.

More specifically, the present invention is directed to a method for supporting or impregnating catalytically active materials selectively only in a specific region such as in the vicinity of the surface of the catalyst support out of the entire pore region in the catalyst support by controlling the immiscibility of the hydrophobic and hydrophilic solvents and the conditions for eliminating the hydrophobic solvent and/or the hydrophilic solvent.

Other embodiments of the present invention include a method for preparing a catalyst having catalytically active materials selectively supported only on the surface of a catalyst particle using the mutual repulsion and the solubility difference between a metal salt precursor between a hydrophobic solvent and a hydrophilic solvent, and a catalyst prepared by the same method, and provide a technique for supporting a precursor of catalytically active materials on the outer surface of a catalyst particle that is prepared by introducing an alcohol, such as ethanol, propanol, butanol, pentanol, or hexanol as a hydrophobic solvent and then a hydrophilic solution containing a metal salt into a catalyst support to cause a slow internal diffusion of the hydrophilic solution due to the repulsive force with the hydrophobic solvent and then drying the catalyst.

The selective surface supporting method for catalytically active materials using a repulsive force between a hydrophilic solvent and a hydrophobic solvent according to the present invention includes: a catalyst support preparation step S10 of preparing a spherical or cylindrical porous inorganic oxide as a catalyst support; a first immersion step S100 of immersing the catalyst support in a hydrophobic, first solvent to fill in surface pores and inner pores of the catalyst support with the hydrophobic, first solvent; a first drying step S200 of performing a drying process to eliminate the hydrophobic, first solvent from the inner pores under the surface of the catalyst support, thus allowing the hydrophobic, first solvent to remain in the pores in an inner central region of the catalyst support; a second immersion step S300 of dissolving catalytically active materials or a precursor of the catalytically active material in a hydrophilic, second solvent to prepare a hydrophilic solution and then immersing the catalyst support from the first drying step in the hydrophilic solution; a second drying step S400 of eliminating the first solvent and the hydrophilic, second solvent of the hydrophilic solution remaining in the catalyst support; and a supporting or impregnation step S500 of performing a calcination or reduction process to form the catalyst material or the precursor of the catalyst material selectively in the surface region of the catalyst support and in the inner pore region under the surface of the catalyst support.

The porous inorganic oxide having a spherical or cylindrical structure is preferably at least one selected from the group consisting of silica, alumina, titania, zirconia, and ceria. In the first immersion step, the catalyst support is immersed in the hydrophobic, first solvent and thereby the surface pores and the inner pores of the catalyst support are filled with the hydrophobic, first solvent.

The drying temperature and the drying time in the first drying step are not specifically limited. The drying temperature is selected in the range from the boiling temperature of the hydrophobic, first solvent minus 50° C. to the boiling temperature of the hydrophobic, first solvent plus 50° C. The drying time in the first drying step is selected in the range of 1 to 120 minutes. When the drying temperature is extremely low or the drying time is extremely short, the hydrophobic, first solvent cannot be sufficiently eliminated. When the drying temperature is extremely high or the drying time is extremely long, the amount of the hydrophobic, first solvent to be removed becomes too much, making more spaces freely accessible by a second solution that is an aqueous solution and excessively increasing the amount of the catalytically active materials to be impregnated in the spaces, and the second solution penetrates deep into the catalyst support particle, ending up with the failure to achieve the object of the present invention to make the catalytically active materials supported only on the surface of the catalyst support and thus reducing the effect of reducing the production cost of the catalyst and enhancing the economical feasibility.

The first drying step includes eliminating the hydrophobic, first solvent remaining on the surface of the catalyst support and the hydrophobic, first solvent filled in the inner pores in the outer part of the catalyst support in the range of one fifth or one half of the distance from the surface of the catalyst support to the center of the catalyst support. The region in the pores of the catalyst support thus removed of the hydrophobic, first solvent is filled with the hydrophilic solution in the subsequent step, that is, the second immersion step.

In this regard, the catalytically active material or the precursor of the catalytically active material is a metal salt of any one metal selected from platinum, ruthenium, rhodium, cobalt, nickel, or palladium, or a precursor of the metal salt. The hydrophobic, first solvent an used in the present invention is preferably at least one selected from the group consisting of n-propanol, n-butanol, n-pentanol, n-hexanol, ethylene glycol, and propylene glycol, and derivatives thereof, and isomers thereof. Preferably, the hydrophilic, second solvent as used in the present invention is water, and the hydrophilic solvent is an aqueous solution of the catalytically active materials or an aqueous solution of the precursor of the catalytically active materials.

Performing the second drying step eliminates the hydrophobic, first solvent and the hydrophilic, second solvent existing in the inner pores of the catalyst support. In the second immersion step, the immersion time is preferably in the range of 1 to 60 minutes. When the immersion time of the second immersion step is too short, the hydrophilic solution cannot sufficiently penetrate into the inner pores of the catalyst support particle. When the immersion time is too long, the productivity deteriorates.

In the first immersion step, sonication may be performed under necessity to fill the inner pores of the catalyst support particle with the hydrophobic, first solvent.

As another embodiment of the present invention, the impregnation method for catalytically active materials on a particulate catalyst support using a mutual repulsive force and the solubility difference between a hydrophilic solvent and a hydrophobic solvent includes: a catalyst support preparation step T100 of preparing a spherical or cylindrical porous inorganic oxide as a catalyst support; a first immersion step T200 of filling inner pores and surface pores of the catalyst support with a hydrophobic solvent; a second immersion step T300 of dissolving catalytically active materials or a precursor of the catalytically active materials in a hydrophilic solvent to prepare a hydrophilic solution and then immersing the catalyst support obtained from the first immersion step in the hydrophilic solution to diffuse the hydrophilic solution from the outer surface of the catalyst support to the inner part of the catalyst support; a drying step T400 of drying the catalyst support obtained from the second immersion step to position the catalytically active material or the precursor of the catalytically active material only in a surface region of the catalyst or in an outer region of the inner pores; and a supporting or impregnation step T500 of performing a calcination or reduction process to form the catalyst material or the precursor of the catalyst material selectively only in the surface region of the catalyst support and an outer region of the catalyst support, wherein the outer region of the catalyst support is an inner pore region under the surface of the catalyst support.

In this regard, the porous inorganic oxide having a spherical or cylindrical structure is preferably at least one selected from the group consisting of silica, alumina, titania, zirconia, and ceria.

In the first immersion step T200, preferably, the catalyst support is immersed in the hydrophobic solvent to fill the surface pores and the inner pores of the catalyst support with the hydrophobic solvent. In the second immersion step T300, a hydrophilic solution containing the catalytically active material or the precursor of the catalytically active material is preferably filled in a surface region of the catalyst support and an inner pore region in the outer part of the catalyst support in the range of one fifth to one half of the distance from the surface of the catalyst support to the center of the catalyst support.

Further, in the drying step T400, the hydrophobic solvent and the hydrophilic solution filled in the surface pores and the inner pores of the catalyst support is eliminated to position the catalytically active material or the precursor of the catalytically active material in the inner pores in the outer part of the catalyst support in the range of one fifth to one half of the distance from the surface of the catalyst support to the center of the catalyst support.

The hydrophobic solvent available in the present invention is preferably at least one selected from the group consisting of ethanol, propanol, butanol, pentanol, hexanol, ethylene glycol, propylene glycol, diethylene glycol, and glycerol. The catalytically active material or the precursor of the catalytically active material is a metal salt of any one metal selected from platinum, ruthenium, rhodium, cobalt, nickel, or palladium, or a precursor of the metal salt.

In the first immersion step T200, sonication may be performed as well in easily fill the inner pores of the catalyst support particle with the hydrophobic solvent. The immersion time of the second immersion step T300 is preferably in the range of 1 to 60 minutes. In this regard, the concentration of the aqueous solution containing the catalytically active material or the precursor of the catalytically active material in the second immersion step can be controlled in the range of 0.5 to 5 M, and the concentration range can be appropriately varied.

As a still another embodiment of the present invention, there is provided a catalyst prepared by one of the above-specified impregnation method for catalytically active materials on a particulate catalyst support.

BRIEF DESCRIPTION OF DRAWINGS

FIG. 4 presents the images of Example 5 of the present invention.

DESCRIPTION OF THE PREFERRED EMBODIMENTS

The present invention is directed to a method for selectively supporting or impregnating catalytically active materials only on the surface of a catalyst support formed from spherical or cylindrical particles or into pores in a region in the vicinity to the outer part connected to the surface of the catalyst support. Hereinafter, a detailed description of the present invention will be described with reference to the specified examples and comparative example after-mentioned.

But, the present invention is not limited to the aforementioned specific examples or the detailed description of the present invention and may be susceptible to different variations by those skilled in the art without departing from the essentials of the present invention as claimed in the claims of the present invention, which variations are also within the scope of the present invention.

Figure 1:
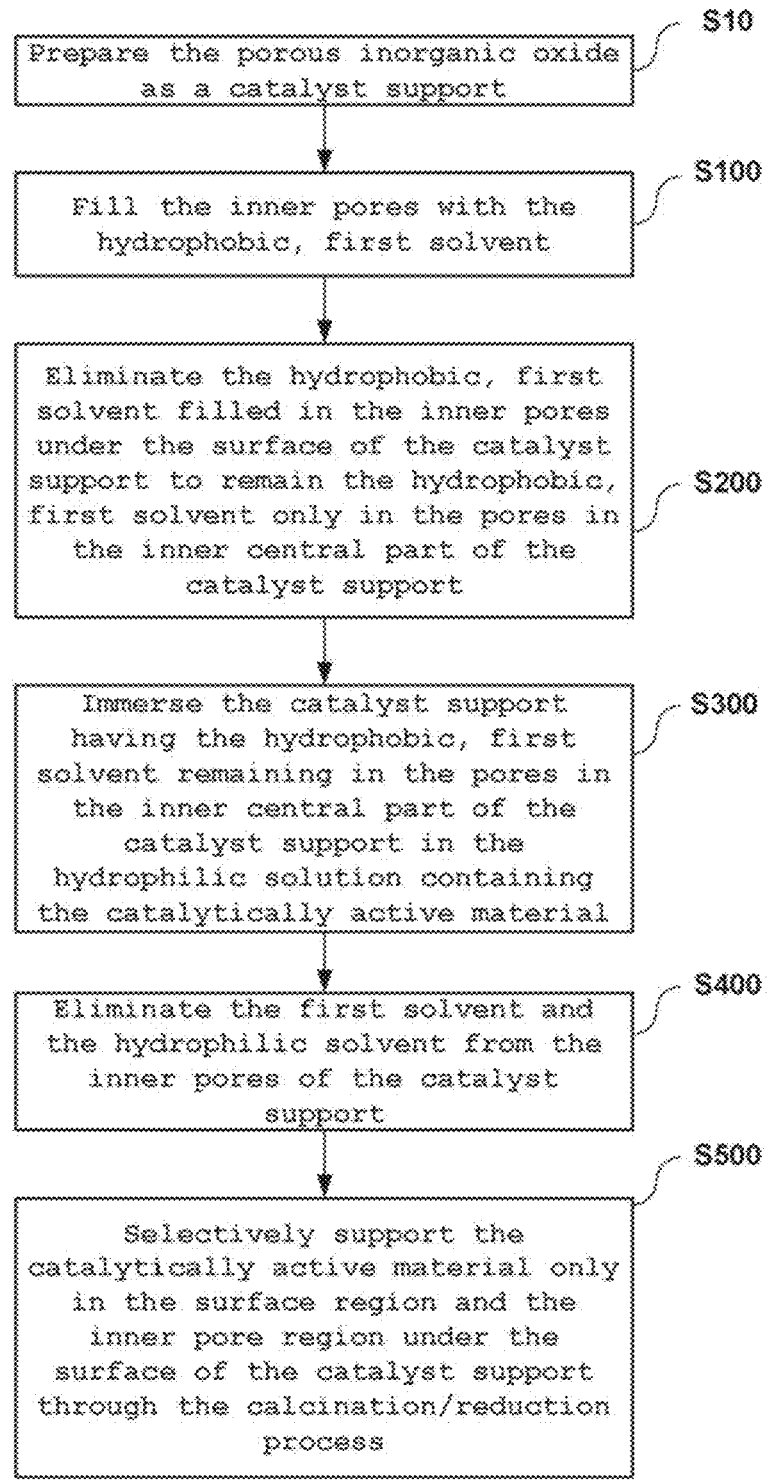
FIG. 1 is a schematic illustration showing a selective surface supporting or impregnation method for catalytically active materials using a repulsive force between a hydrophilic solvent and a hydrophobic solvent according to one embodiment of the present invention.

FIG. 1 is a schematic flow chart showing the individual steps of a selective surface supporting or impregnation method for catalytically active materials using a repulsive force between a hydrophilic solvent and a hydrophobic solvent according to one embodiment of the present invention.

Firstly, a variety of porous inorganic oxides having a spherical or cylindrical shape are prepared as a catalyst support. The porous inorganic oxide used as a catalyst support in the present invention may have micro-pores on the surface and/or inside thereof and include at least one selected from the group consisting of silica, alumina, titania, zirconia, and ceria. The porous inorganic oxide is not specifically limited in shape but is preferably a spherical or cylindrical particle.

After the porous catalyst support is prepared (in step S10), a first immersion step S100 is carried out to sufficiently soak the porous catalyst support particle with a first solvent that is hydrophobic. In this regard, it is preferable to perform the first immersion step in combination with a sonication so that the hydrophobic, first solvent can penetrate deep into the porous catalyst support particle.

The hydrophobic, first solvent is preferably an alcohol having 2 to 6 carbon atoms. It is more preferable that the hydrophobic, first solvent is at least one selected from the group consisting of ethanol, n-propanol, n-butanol, n-pentanol, n-hexanol, ethylene glycol, propylene glycol, and their derivatives and isomers.

After the hydrophobic, first solvent sufficiently penetrates into the pores in the catalyst support particle, a first drying step S200 is carried out under appropriate drying conditions to remain the hydrophobic, first solvent only in a specific region in the particle. In this regard, the drying temperature of the first drying step is preferably in the range from the boiling temperature of the hydrophobic, first solvent minus 50° C. to the boiling temperature of the hydrophobic, first solvent plus 50° C. Further, the drying time of the first drying step is preferably 1 minute to 120 minutes. It is of course possible to control the amount of the hydrophobic, first solvent remaining in the pores of the porous catalyst support particles or the drying temperature and time of the first drying step differently according to the type of the hydrophobic, first solvent.

For example, the first drying step can eliminate the hydrophobic, first solvent remaining on the surface of the catalyst support and the hydrophobic, first solvent filled in the inner pores in the outer part of the catalyst support in the range of one fifth to one half of the distance from the surface of the catalyst support to the center of the catalyst support. As a result of the first drying step, the hydrophobic, first solvent can remain only in the inner pores in the inner part of the catalyst support in the range of four fifths to one half of the distance from the surface of the catalyst support to the center of the catalyst support.

While the hydrophobic, first solvent remains only in a specific region of the inner pores of the catalyst support, a second immersion step S300 is carried out to immerse the catalyst support m a hydrophilic solution containing catalytically active materials or a precursor of the catalytically active material dissolved in a second solvent that is hydrophilic.

Hardly miscible with the hydrophobic, first solvent filled in a specific region in the porous catalyst support, the hydrophilic solution is filled only in a surface region of the catalyst support and in a pore region in the outer part of the catalyst support in the vicinity of the surface region. In other words, the porous catalyst support obtained from the first immersion step and the first drying step is immersed in the hydrophilic solution in the second immersion step to fill the pore region and the surface region of the porous catalyst support other than the region filled with the hydrophobic, first solvent, due to the repulsive force and the immiscibility of the hydrophilic solvent and the hydrophobic solvent.

The hydrophilic solution used in the second immersion step contains catalytically active materials or a precursor of the catalytically active material dissolved in the hydrophilic, second solvent. The catalytically active material or the precursor of the catalytically active material as used in the present invention is not specifically limited and may be preferably an expensive metal-based material or its precursor that is soluble to a hydrophilic solvent, more preferably a metal salt of any one metal selected from platinum, ruthenium, rhodium, cobalt, nickel, or palladium, or a precursor of the metal salt.

The hydrophilic, second solvent used in the hydrophilic solvent is preferably a polar solvent, and more particularly, water that is one of the representative polar solvents.

The porous catalyst support particles obtained from the second immersion step is subjected to the second drying step S400 to remove the hydrophobic, first solvent and the hydrophilic solution remaining on the surface of the porous catalyst support and in the inner pores of the porous catalyst support. As a result, the catalytically active material or the precursor of the catalytically active material remains only on the surface of the porous catalyst support and in a specific region of the catalyst support in the vicinity of the surface dial used to be filled with the hydrophilic solution. This can allow the catalytically active materials to selectively remain only in the surface part of the formulated catalyst support.

Figure 2:
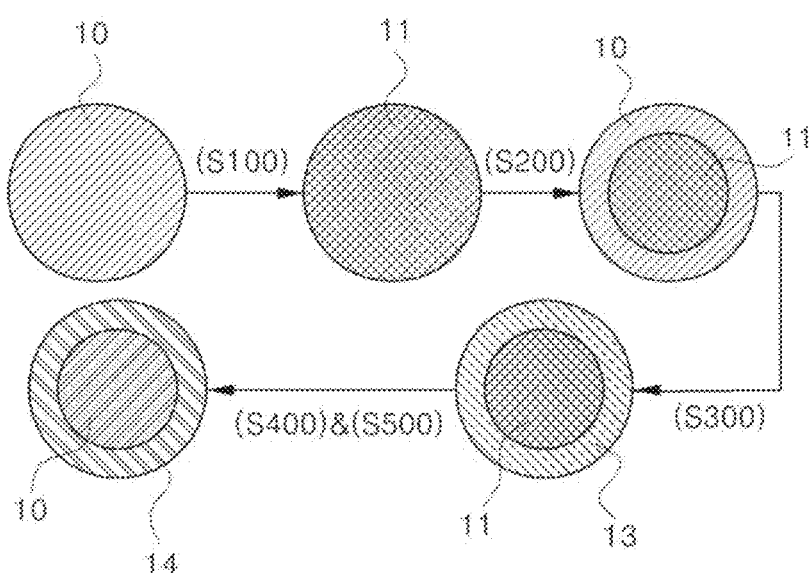
FIG. 2 is a schematic illustration showing the change in the structure of the catalyst support according to the selective surface supporting or impregnation method for catalytically active materials using a repulsive force between a hydrophilic solvent and a hydrophobic solvent in accordance with one embodiment of the present invention.

It is therefore possible to support or impregnate the catalytically active material selectively only in the surface part of the catalyst support through the subsequent calcination or reduction step S500. The internal change of the catalyst support particles after the step is schematically shown in FIG. 2.

In other words, the present invention has an advantage that the catalytically active materials con be supported only in a specific region of the porous catalyst support by immersing the catalyst support in a hydrophobic solvent and a hydrophilic solvent in sequence, thereby reducing a wasteful use of the expensive catalytic metal or the precursor of the catalytic metal material and thus realizing an economical production of the catalyst.

When the hydrophobic, first solvent is benzene, toluene, hexane, or the like, the interaction between the porous catalyst support such as alumina or silica and the first solvent is so weak that the hydrophilic solution containing the catalytically active material or the precursor of the catalytically active material and being used to immerse the porous catalyst support pushes away benzene, toluene, hexane, or the like and penetrates into the inner pores of the porous catalyst support particle. Therefore, such a solvent as benzene, toluene, hexane, or the like that has a weak interaction with the porous catalyst support particle is not suitable for the selective impregnation of the catalytically active material according to the present invention.

To the contrary, alcohols having 2 to 6 carbon atoms in the alkyl group (e.g., ethanol, propanol, butanol, pentanol, hexanol, etc.) and polyols (e.g., ethylene glycol, propylene glycol, etc.) contain a hydroxyl group (—OH) having an appropriately strong interaction with the porous surface part of the catalyst support like porous silica or porous alumina and thus can be firmly kept in the pores dialing the first immersion step and the first drying step. Besides, the hydrophobic properly peculiar to the alkyl groups prevents a possible access of the hydrophilic solution containing the catalytically active material or the precursor of the catalytically active material to the inner pores of the catalyst support particle. This enables a selective supporting or impregnation of the catalytically active material according to the present invention.

Accordingly, when the catalyst prepared by the present invention method is used as a catalyst for steam methane reforming reaction or water-gas shift reaction of which the reaction conditions involve a high space velocity (that is, when using the surface region of the catalyst particle only other than the inside part of the catalyst particle), it is possible to achieve the equivalent conversion rate and selectivity of the general catalysts even though a small amount of the catalytically active material is supported or impregnated. Further, when the catalyst prepared by a general impregnation method using the Fischer-Tropsch reaction and a catalyst particle having a particle size of 1 to 3 mm is used to support or impregnate the catalytically active material on the entire region of the particle, it may possibly cause a limitation in the diffusion of a reactant, CO, and thus reduce the production rate and selectivity of the hydrocarbon having at least 5 carbon atoms. Contrarily, the use of the catalyst prepared by the present invention method overcomes this problem and enhances the efficiency of the Fischer-Tropsch reaction.

Hereinafter, the specific application examples of the present invention will be described in further detail with reference to Examples and Comparative Example.

The catalyst support used in the Examples and the Comparative Example of the present invention is a spherical alumina particle. As can be seen from the Comparative Example in (a) of FIG. 3, the cross-section of the porous catalyst support particle not used to support or impregnate an aqueous solution of the catalytically active material is white. But the portion of the porous catalyst support particle used to support the catalytic component takes the color of the catalytic component (for example, purple-colored when supporting cobalt nitrate).

In the Examples of the present invention, the catalytically active material can be supported only in a specific region such as the surface region of the porous catalyst support as demonstrated in the following experiment. Firstly, a first immersion step is carried out to immerse a porous alumina catalyst support used as a catalyst support particle in a hydrophobic, first solvent until no bubble appears on the hydrophobic, first solvent. The first immersion step can be appropriately controlled in consideration of the pore size and porosity of the catalyst support, the type and viscosity of the hydrophobic, first solvent and the surface tension with the catalyst support. Further, a sonication may also be performed under necessity to introduce the hydrophobic, first solvent sufficiently into the pores of the catalyst support.

Subsequent to the first immersion step, a first drying step is carried out by putting the catalyst support in a sieve net, shaking the sieve net to eliminate the hydrophobic, first solvent collected on the surface of the catalyst support and then drying the catalyst in an oven set to a first drying temperature for a predetermined drying time.

The drying temperature and the drying time of the first drying step can be controlled appropriately in consideration of the amount of the hydrophilic solution introduced into the pores of the catalyst support through the second immersion step. The drying temperature is preferably selected in the range of the boiling temperature of the hydrophobic, first solvent plus/minus 50° C., and the drying time is preferably selected in the range of 1 to 120 minutes.

Subsequent to the first drying step, a second immersion step is carried out by immersing the catalyst support particles in a hydrophilic solution or an aqueous solution containing cobalt nitrate as catalytically active materials at the concentration of 0.5 M.

The immersion time of the second immersion step is preferably controlled in the range of 10 to 60 minutes properly in consideration of the volume of voids (that is, the space into which the hydrophilic solution or the aqueous solution containing the catalytically active material is to penetrate) in the inner pores of the catalyst support particle as produced from the first drying step, the viscosity of the hydrophilic solution or the aqueous solution introduced through the second immersion step, the concentration of the catalytically active material, and so forth.

Then, the remaining hydrophilic solution or aqueous solution containing the catalytically active material or the precursor of the catalytically active material is removed from the surface of the catalyst support particle obtained from the second immersion step of immersing the catalyst support particle in the hydrophilic solution or the aqueous solution for a predetermined period of time.

After completion of the second immersion step, a second drying step is conducted on the porous catalyst support particle having the first solvent filled in the central region and the hydrophilic solution containing the catalytically active material filled in a region of the porous catalytic support particle in the vicinity of the surface. This can completely eliminate the hydrophobic, first solvent or the hydrophilic, second solvent of the hydrophilic solution or the aqueous solution that is filled in the inner pores of the porous catalyst support particle.

The drying temperature and the drying time of the second drying step are not specifically limited and preferably determined in such a range as to completely remove the hydrophobic, first solvent and the hydrophilic, second solvent from the pores of the catalyst support particles. Such drying temperature and drying time are easy to determined by the skilled in the art through on appropriate experiment.

As a consequence of the second drying step, the catalytically active material remains only in a region that used to be filled with the hydrophilic solution out of the inner pore region of the catalyst support. Through the subsequent calcination or reduction step, the catalyst material can be supported or impregnated selectively only in a region in the vicinity of the surface of the catalyst support.

Figure 3:
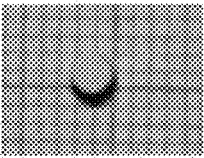
FIG. 3 presents the images of Examples 1 to 4 of the present invention and Comparative Example.
Figure 3:
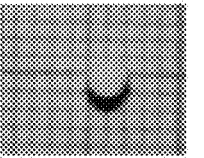
Figure 3:
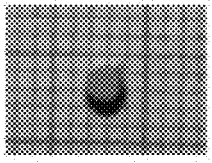
Figure 3:
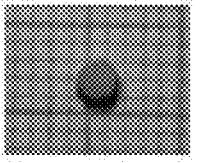
Figure 3:
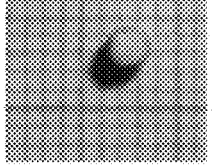
Figure 3:
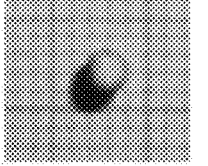
Figure 3:
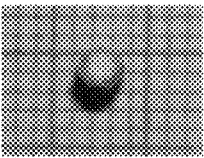
Figure 3:
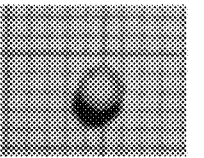
Figure 3:
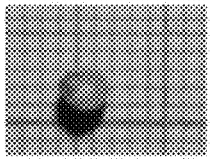
Figure 3:
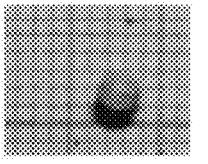
Figure 3:
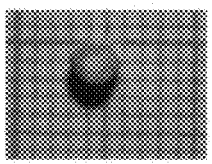
Figure 3:
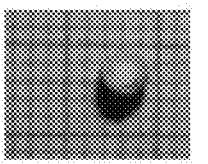

(b) in FIG. 3 shows a spherical alumina catalyst support particle that is immersed in an aqueous solution containing the precursor of the catalytically active material (i.e., a 0.5M aqueous solution of cobalt nitrate) for 20 minutes and then dried out. The 20-minute immersion step makes the entire inside part of the catalyst support turn dark purple, which means that the aqueous solution of the catalytic component completely penetrates into the alumina catalyst support. Like this, the immersion step is carried out using a 0.5M aqueous solution of cobalt nitrate that is a hydrophilic solution, rather than the hydrophobic, first solution. In this case, it can be seen that the hydrophilic solution containing the catalytically active material can completely penetrate into the entire pore region of the porous catalyst support within one to three minutes of the immersion process.

The Examples and the Comparative Example of the present invention are performed under the following experimental conditions.

TABLE 1

Experimental conditions of Examples 1 to 4 and Comparative Example

| | First drying temp. (° C.) | First drying time (min) | Second immersion time (min) | Reference |
|---|---|---|---|---|
| Comparative Example | — | — | 20 | (b) of FIG. 3 |
| Example 1 | 130 | 30 | 10 | (c) of FIG. 3 |
| Example 2 | 130 | 120 | 30 | (d) of FIG. 3 |
| Example 3 | 150 | 60 | 30 | (e) of FIG. 3 |
| Example 4 | 150 | 60 | 60 | (f) of FIG. 3 |

(In this regard, the porous catalyst support particle is porous alumina; the hydrophobic, first solvent is n-pentanol; and the hydrophilic solution is a 0.5M aqueous solution of cobalt nitrate.)

(a) in FIG. 3 represents the pristine catalyst support. The white color of catalyst support means that this support contains no catalytically active materials such as cobalt nitrate.

In the case of the immersion process using the hydrophilic solution alone at in the Comparative Example of the present invention, the aqueous solution of cobalt nitrate can penetrate into the entire pore region, even into the central region of the catalyst support particle, as can be seen from (b) in FIG. 3.

As for the catalyst prepared under the conditions of Example 1 of the present invention, the cobalt nitrate precursor remains only on the surface of the porous catalyst support, that is, the alumina particle, as shown in (c) in FIG. 3.

In Example 2, the experiment is performed while the drying time of the first drying step is longer than in Example 1. As can be seen from (d) in FIG. 3, such an increase in the drying time of the first drying step results in a decrease in the remaining amount of the hydrophobic, first solution and allows the cobalt nitrate precursor as the precursor of the catalytically active material to be pushed more towards the inner part of the catalyst support particle.

This fact presumably results from the fact that an increase in the drying time of the hydrophobic solvent reduces the volume of the hydrophobic solvent in the catalyst support particle, making the concentric circle of the central portion taken by the hydrophobic solvent smaller, so that the aqueous solution of cobalt nitrate that is a hydrophilic solution occupies the increased void space. This shows that controlling the drying conditions makes it possible to control the amount of the catalytically active material supported or impregnated in the porous catalyst support.

(e) and (f) in FIG. 3 present the experimental results of the Examples 3 and 4 in which the immersion time of the hydrophilic solution is 30 minutes and 60 minutes, respectively. As the second immersion time increases, the white concentric circle representing the space occupied by the hydrophobic solvent becomes smaller considerably. In addition, a considerable amount of pentanol that is the hydrophobic, first solvent is removed through the first drying step under the drying conditions of 150° C., and cobalt nitrate that is the precursor of the catalytically active material occupies the resultant void space.

As can be seen from the Comparative Example and the Examples 1 to 4, in the inner pore region of the porous catalyst support, the hydrophilic solution cannot access to the region occupied by the hydrophobic, first solvent through the first immersion step. Further, the volume of the space occupied by the hydrophobic solvent out of the inner pore region of the porous catalyst support can be controlled by adjusting the conditions of the first drying step of eliminating the hydrophobic, first solvent, thereby achieving a selective supporting or impregnation of the catalytically active material.

In particular, as can be seen from the experimental results, the first drying step can be carried out to eliminate the hydrophobic, first solvent remaining on the surface of the catalyst support and the hydrophobic, first solvent filled in an inner pore region in the outer part of the catalyst support in the range of one fifth to one half of the distance from the surface of the catalyst support to the center of the catalyst support. And, the second immersion step is carried out to fill the hydrophobic solvent in the surface region of the catalyst support removed of the hydrophobic, first solvent through the first drying step and in an inner pore region in the inner part of the catalyst support in the range of four fifths to one half of the distance from the surface of the catalyst support to the center of the catalyst support.

In order to determine the possibility of controlling the region and the main factor for the catalytically active material supported or impregnated inside of pores in the porous catalyst support, the region in which the catalytically active material is finally supported or impregnated is directly observed while varying the type of the hydrophobic, first solvent and the concentration of the catalytically active material and changing the first drying time, the first drying temperature, and the second immersion time as given in Table 2 (Refer to FIG. 4).

TABLE 2

Experimental conditions of Example 5

| | First drying temp. (° C.) | First drying time (min) | Second immersion time (min) | Reference |
|---|---|---|---|---|
| Example 5-1 | 90 | 5 | 10 | (a) of FIG. 4 |
| Example 5-2 | 90 | 10 | 10 | (b) of FIG. 4 |
| Example 5-3 | 90 | 1 | 10 | (c) of FIG. 4 |
| Example 5-4 | 90 | 1 | 5 | (d) of FIG. 4 |
| Example 5-5 | 90 | 5 | 5 | (e) of FIG. 4 |
| Example 5-6 | 90 | 10 | 5 | (f) of FIG. 4 |
| Example 5-7 | 50 | 5 | 10 | (g) of FIG. 4 |
| Example 5-8 | 50 | 10 | 10 | (h) of FIG. 4 |

(In this regard, the porous catalyst support particle is porous alumina; the hydrophobic, first solvent is n-propanol; and the hydrophilic solution is a 3M aqueous solution of cobalt nitrate.)

As can be seen from (a) to (f) in FIG. 4 for the catalyst supporting or impregnating particle prepared under the above-defined experimental conditions, when the first drying time is varied in the range of 1 to 10 minutes while the first drying temperature (90° C.) and the second immersion time (10 min or 5 min) are constant, the penetration depth of the hydrophilic solution into the inner pores of the porous catalyst support particle tends to increase. This shows that the amount of the catalytically active material supported or impregnated in a region in the vicinity of the surface of the porous catalyst support can be effectively controlled by adjusting the drying time of the hydrophobic, first solvent.

In addition, the change in the amount of the catalytically active material supported or impregnated in a region in the vicinity of the surface of the porous catalyst support is observed while the first drying temperature is varied while the first drying time is constant (5 min or 10 min) (in Examples 5-1 and 5-8 and Examples 5-7 and 5-2). It can be seen that the hydrophobic, first solvent around the surface of the catalyst support particle is effectively removed even at a temperature lower than the boiling temperature (97° C.) of the hydrophobic, first solvent. But, the catalytically active material impregnated at a relatively high drying temperature has a somewhat greater deviation of the thickness than the catalytically active material impregnated at a relatively low drying temperature.

Finally, the change in the amount of the catalytically active material supported or impregnated in a region in the vicinity of the surface of the catalyst support is observed while the drying temperature of the first drying step is constant (90 C) and the second immersion time is varied (5 min, 10 min) (Examples 5-4 and 5-3; the first drying time is 1 minute; Examples 5-5 and 5-1; the first drying time is 5 minutes; and Examples 5-6 and 5-2; the first drying time is 10 minutes).

Referring to the experimental results of (a) to (f) in FIG. 4 under the above-defined conditions, it can be seen that the change in the second immersion time does not have such a great effect on the impregnated amount of the catalytically active material in comparison to the change in the first drying temperature or the first drying time.

In this manner, according to one exemplary embodiment of the present invention, it is possible to prepare a catalyst particle in which the region for supporting or impregnating the catalytically active material in the catalyst support is controlled, by applying a hydrophobic solvent and a hydrophilic solvent to position the catalyst material or the precursor of the catalyst material selectively in the vicinity of the surface of the porous catalyst support and then properly conducting a known calcination/reduction step or the like according to the type of the catalytically active materials or the precursor of the catalytically active materials. Further, by controlling the process variables related with corresponding steps (i.e., the drying temperature in the first step, the drying time in the first step, and the immersion time in the second step), the catalytically active material can be selectively filled in the inner pore region in the vicinity of the surface of the catalyst support particle in the range of one fifth to one half of the distance from the surface of the catalyst support particle to the center of the catalyst support particle.

Figure 5:
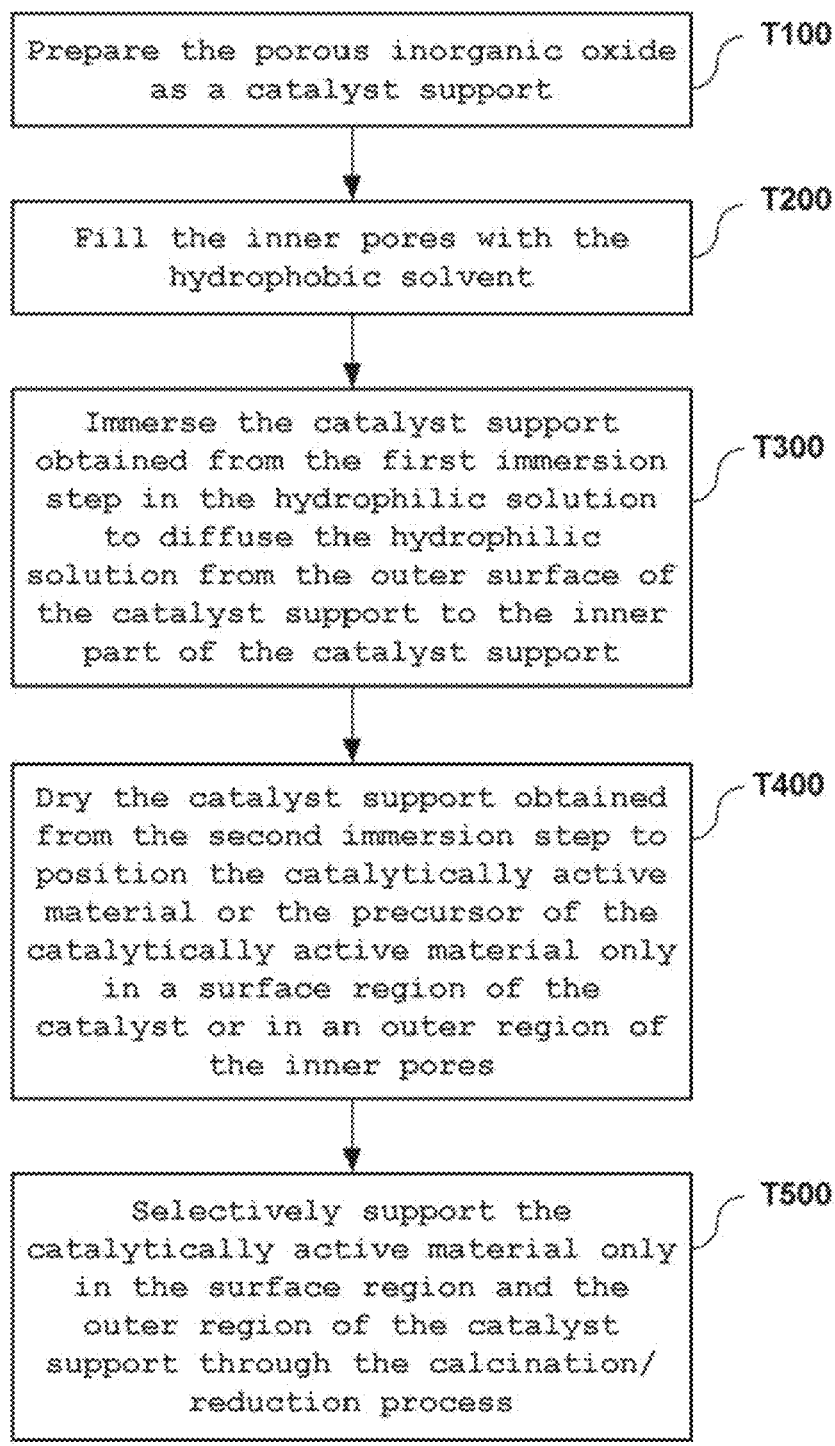
FIG. 5 is a stepwise illustration showing a method for impregnating catalytically active materials on a particulate catalyst support using the mutual repulsive force and the solubility difference between a hydrophilic solvent and a hydrophobic solvent according to another embodiment of the present invention.

FIG. 5 is a schematic flow chart showing the individual steps of a selective surface supporting or impregnation method for catalytically active materials using a repulsive force between a hydrophilic solvent and a hydrophobic solvent according to another embodiment of the present invention.

Firstly, a porous inorganic oxide having a spherical or cylindrical shape is prepared as a catalyst support. The porous inorganic oxide used as a catalyst support in the present invention may have micro-pores on the surface and/or inside thereof and include at least one selected from the group consisting of silica, alumina, titania, zirconia, and ceria. The porous inorganic oxide is not specifically limited in shape but is preferably a spherical or cylindrical particle.

After the porous catalyst support is prepared (in step T100), a first immersion step T200 is carried out to sufficiently soak the porous catalyst support particle with a hydrophobic solvent and fill the inner pores and the surface pores of the catalyst support with the hydrophobic solvent. In this regard, it is preferable to perform the first immersion step in combination with a sonication so that the hydrophobic solvent can sufficiently penetrate deep into the porous catalyst support particle.

More preferably, the hydrophobic solvent is at least one selected from the group consisting of ethanol, propanol, butanol, pentanol, hexanol, ethylene glycol, propylene glycol, diethylene glycol, and glycerol, and their derivatives and isomers.

After the hydrophobic solvent sufficiently penetrates into the pores in the catalyst support particle, a first immersion step T300 is carried out to immerse the catalyst support particle in a hydrophilic solution containing catalytically active materials or a precursor of the catalytically active material dissolved in a hydrophilic solvent. The hydrophilic solvent is preferably water.

The interaction between the hydrophobic solvent and the hydrophilic solvent is of a great importance in performing the first immersion step and the second immersion step. When the hydrophobic solvent is benzene, toluene, or hexane, the interaction between the alumina or silica catalyst support and the hydrophobic solvent is so weak that the hydrophilic solution (i.e., an aqueous solution of a metal salt as catalytically active materials or a precursor of the catalytically active material) in contact with the catalyst support pushes the hydrophobic solvent, such as benzene, toluene, hexane, etc., away. Consequently, the hydrophilic solution can penetrate into the catalyst support particle with ease.

It is therefore undesirable to use the solvents, such as benzene, toluene or hexane, having a weak interaction with the surface of the alumina particle in the selective impregnation method for catalytically active materials according to the present invention.

Figure 6:
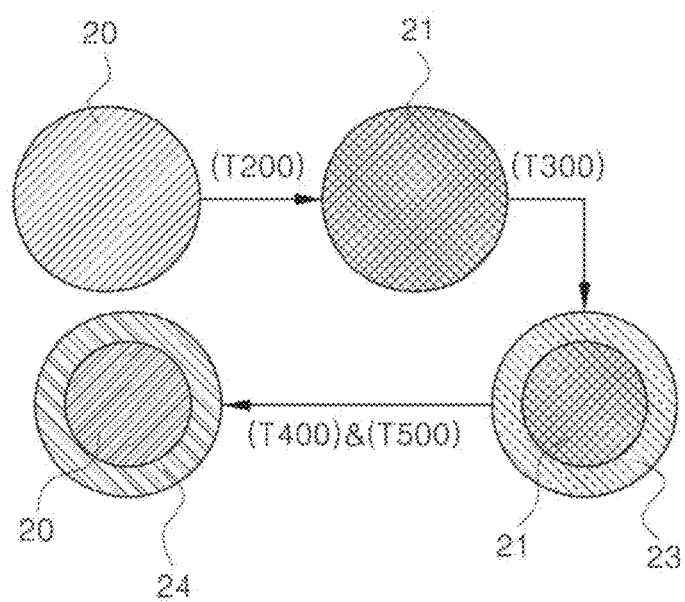
FIG. 6 is a schematic illustration showing a selective surface supporting or impregnation method for catalytically active materials using the repulsive force between a hydrophilic solvent and a hydrophobic solvent according to further another embodiment of the present invention.

To the contrary, alcohols having 2 to 6 carbon atoms in the alkyl group (e.g., ethanol, propanol, butanol, pentanol, hexanol, etc.) contain a hydroxyl group (—OH) having an appropriately strong interaction with the porous surface of the catalyst support like porous silica or porous alumina and thus can be fixedly kept in the pores. Besides, the hydrophobic properties peculiar to the alkyl group prevent a possible access of the hydrophilic solution to the inside of the catalyst support particle. With this, as shown in FIG. 6, the metal salt corresponding to the precursor including the catalytically active material or the precursor of the catalytically active material can be selectively formed only in the vicinity of the surface of the catalyst support and/or in an outer part of the catalyst support that is an inner pore region under the surface of the catalyst support.

In this regard, the hydrophobic solvent as used herein may be at least one hydrophobic solvent selected from the group consisting of an alcohol having 2 to 6 carbon atoms in the alkyl group such as ethanol, propanol, butanol, pentanol, hexanol, etc., ethylene glycol, propylene glycol, diethylene glycol, and glycerol.

As the hydrophobic solvent filled in a specific region in the porous catalyst support is immiscible with the hydrophilic solution, the hydrophilic solution is filled in a surface region of the porous catalyst support and a pore region in the outer part of the porous catalyst support in the vicinity of the surface. In other words, the porous catalyst support particle from the first immersion step is subjected to the second immersion step and immersed in the hydrophilic solution, so the hydrophilic solution is filled in the pore region in the outer pan of the porous catalyst support and in the surface region of the porous catalyst support other than the inner central region of the catalyst support particle, which is filled with the hydrophobic solvent, due to the repulsive force and immiscibility of the hydrophilic solvent and the hydrophobic solvent and the interaction between the hydrophobic solvent and the inner pore surface of the catalyst support particle.

The hydrophilic solution used in the second immersion step is a solution of the catalytically active material or the precursor of the catalytically active material dissolved in water used as the hydrophilic solvent the catalytically active material or the precursor of the catalytically active material as used in the present invention is not specifically limited and may be preferably an expensive metal material or its precursor that is soluble to the hydrophilic solvent and more preferably a metal salt of any one metal selected from platinum, ruthenium, rhodium, cobalt, nickel, or palladium, or a precursor of the metal salt.

The hydrophilic solvent used in the hydrophilic solution is preferably a polar solvent, and more preferably, water that is one of the representative polar solvents.

The porous catalyst support particle from the second immersion step is subjected to a drying step T400 to slowly eliminate the hydrophobic solvent and the hydrophilic solvent remaining on the surface of the porous catalyst support and in the pores of the porous catalyst support. As a result, the catalytically active material or the precursor of the catalytically active material remains only on the surface region of the porous catalyst support and in a region in the vicinity of the surface of the porous catalyst support that used to be filled with the hydrophilic solution. This allows the catalytically active material to remain only in the surface region of the formulated catalyst support particle and/or in the outer part of the catalyst support particle that is the inner pore region under the surface of the porous catalyst support particle.

It is therefore possible to support or impregnate the catalytically active material selectively only in the surface region of the formulated catalyst support through the subsequent calcination or reduction step T500. The internal change of the catalyst support panicle after the individual steps of the present invention is schematically shown in FIG. 6.

In other words, the present invention involves immersing the spherical or cylindrical porous catalyst support particle in a hydrophobic solvent and a hydrophilic solvent in sequence, so the catalytically active material or the precursor of the catalytically active material con be supported only in a specific region of the porous catalyst support (i.e., the surface region of the porous catalyst support and the outer part of the catalyst support particle that is the inner pore region under the surface of the catalyst support particle). This can prevent a wasteful use of the expensive catalytic metal or the precursor of the catalytic metal material in the preparation of a catalyst and thus enable the production of the catalyst with economical efficiency. The expensive catalytic metal or the precursor of the catalytic metal material may be a metal salt of any one metal selected from platinum, ruthenium, rhodium, cobalt nickel and palladium, or a precursor of the metal salt.

In the present invention, the regions of the catalyst support panicle in which the catalytically active material or the precursor of the catalytically active material is selectively formed correspond to the surface region of the catalyst support and the inner pore region that is the outer part of the catalyst support in the range of one fifth to one half of the distance from the surface of the catalyst support to the center of the catalyst support. The regions of the catalyst support particle into which the hydrophilic solution penetrate in the second immersion step are also the same as the above-defined regions or correspond to the above-defined regions.

The regions of the catalyst support particle in which the catalytically active material or the precursor of the catalytically active material is selectively formed can be controlled differently according to the type and viscosity of the hydrophobic solvent, the type and concentration of the catalytically active material or the precursor of the catalytically active material contained in the hydrophilic solution, the viscosity of the hydrophilic solution, the immersion time of the first and second immersion steps, the porosity and pore size distribution of the catalyst support particle, the surface tension with the catalyst support, and so forth. The immersion time of the second immersion step may be controlled in the range of about 1 to 60 minutes, and the concentration of the aqueous solution containing the catalytically active material or the precursor of the catalytically active material in the hydrophilic solution can be controlled in the range of 0.5 to 5 M. It is apparent to those skilled in the art that the immersion time of the second immersion step and the concentration of the aqueous solution con be adjusted under necessity.

Accordingly, when the catalyst prepared by the present invention method is used as a catalyst for steam methane reforming reaction or water-gas shift reaction of which the reaction conditions involve a high space velocity (that is, when using the surface region of the catalyst particle only other than the inside part of the catalyst particle), it is possible to achieve the equivalent conversion rate and selectivity of the general catalysts even though a small amount of the catalytically active material is supported or impregnated. Further, when the catalyst prepared by a general impregnation method using the Fischer-Tropsch reaction and a catalyst particle having a particle size of 1 to 3 mm is used to support or impregnate the catalytically active material on the entire region of the particle, it may possibly cause a limitation in the diffusion of a reactant, CO, and thus reduce the production rate and selectivity of the hydrocarbon having at least 5 carbon atoms. Contrarily, the use of the catalyst prepared by the present invention method overcomes this problem and enhances the efficiency of the Fischer-Tropsch reaction.

Hereinafter, the specific application examples of another embodiment of the present invention will be described in further detail with reference to the specific Examples.

Example 6

In the Examples of the present invention, the catalyst support is a spherical alumina particle and the aqueous solution of a catalytic component is an aqueous solution of cobalt nitrate.

Firstly, a first immersion step is carried out using propanol as a hydrophobic solvent. The immersion time of the hydrophobic solvent is 30 minutes or longer. A treatment such as sonication is adopted to sufficiently fill the inner pores of the catalyst support particle with the hydrophobic solvent. The immersion time may be 50 to 60 minutes for a hydrophobic solvent having a high viscosity (e.g., glycols or glycerols) and about 20 to 30 minutes for alcohols (e.g., propanol).

Next a second immersion step is carried out using a 1M aqueous solution of cobalt nitrate as a hydrophilic solution. The immersion time of the second immersion step is varied in the range of 1 to 90 minutes. In each case, the cross-section of the catalyst support particle is observed with an optical microscope. The results are presented in FIG. 7. As can be seen from the results, the cobalt nitrate gets penetrating into the porous catalyst support particle.

The experiment is performed in the same manner as describe above, excepting that the concentration of the cobalt nitrate in the hydrophilic solution is increased to 3 M. The same tendency is observed that the cobalt nitrate gets penetrating into the porous catalyst support particle with an increase in the immersion time of the second immersion step. But, with an increase in the concentration of the catalytically active material or the precursor of the catalytically active material in the hydrophilic solution, the cobalt nitrate can penetrate faster into the porous catalyst support particle. Compared to the previous case of using a 1M hydrophilic solution, the thicker catalytically active material layer can be formed by penetrating of cobalt nitrate solution more inside the porous catalyst support particle (Refer to FIG. 4).

Figure 7:
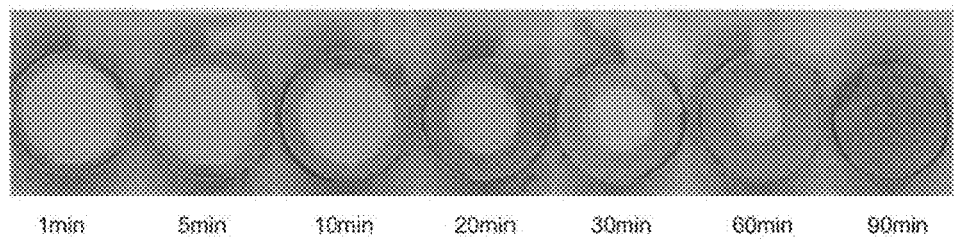
FIGS. 7 and 8 present images showing the cross-section of a catalyst prepared in accordance with still another embodiment of the present invention.
Figure 8:
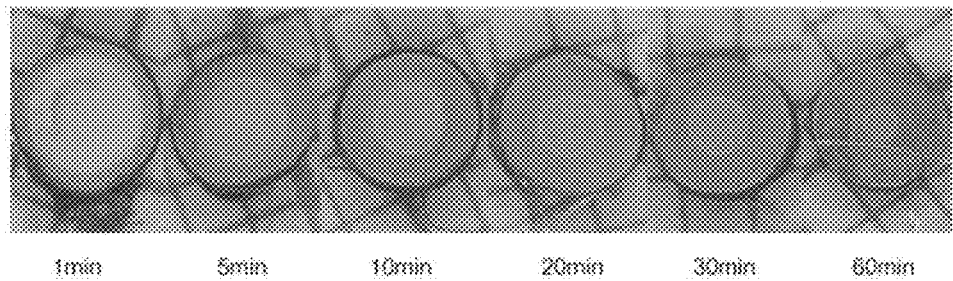
Figure 9:
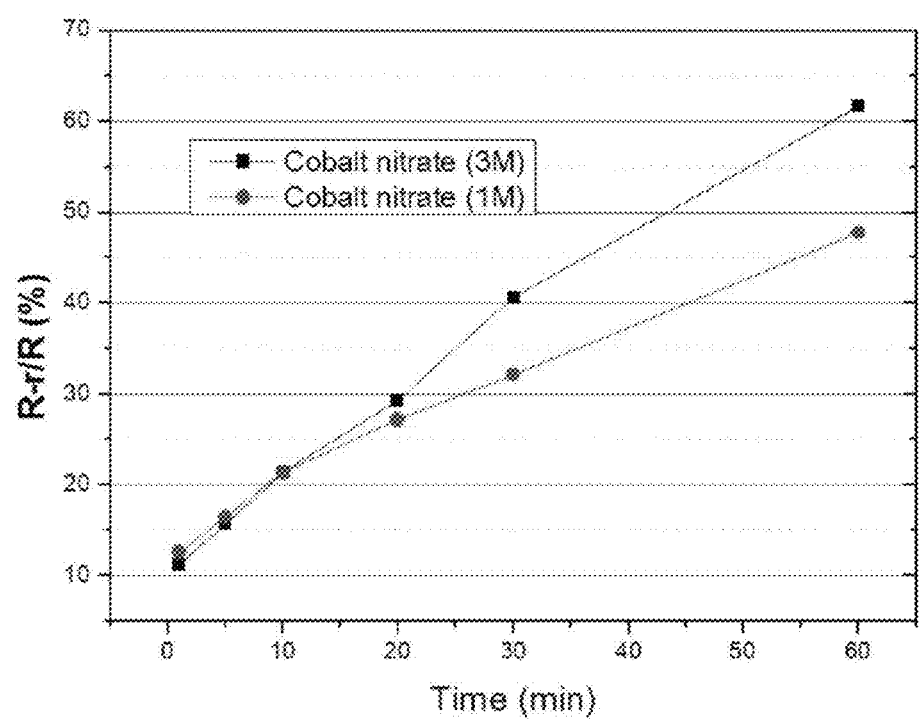
FIG. 9 shows the measurement results of the penetration depth of the hydrophilic aqueous solution into the catalyst support as a function of time when the hydrophobic solvent is propanol and the concentration of the catalytically active material in the hydrophilic aqueous solution is 1 M or 3 M.

A brief overview of the results in FIGS. 7 and 8 shows that the penetration depth of the catalytically active material layer is plotted as a function of the immersion time of the second immersion step, as illustrated in FIG. 9. In FIG. 9, the y-axis represents the deposition degree of catalytically active material on support obtained by the ratio between (R-r) over R. The radius "r" is defined as a radius of the region into which the catalytically active materials does not penetrate. The radius "R" is the radius of catalyst support particle.

The results of FIG. 9 represent the degree of penetration for the aqueous solution of cobalt nitrate used as a hydrophilic solution into the catalyst support particle as a function of the concentration of the aqueous solution of cobalt nitrate. As the concentration of the catalytically active material in the hydrophilic aqueous solution increased from 1 M to 3M, the penetration depth into the porous catalyst support particle increases. This shows that the diffusion rate of the catalytically active material into the porous catalyst support particle increases with an increase in the concentration of the hydrophilic aqueous solution.

Example 7

In order to determine the degree of diffusion of the catalytically active material depending on the type of the hydrophobic solvent, the first immersion step is carried out using different hydrophobic solvents and the second immersion step is then carried out using a 3M aqueous solution of cobalt nitrate as a hydrophilic aqueous solution while the immersion time is varied in the range of 1 to 60 minutes.

Figure 10:
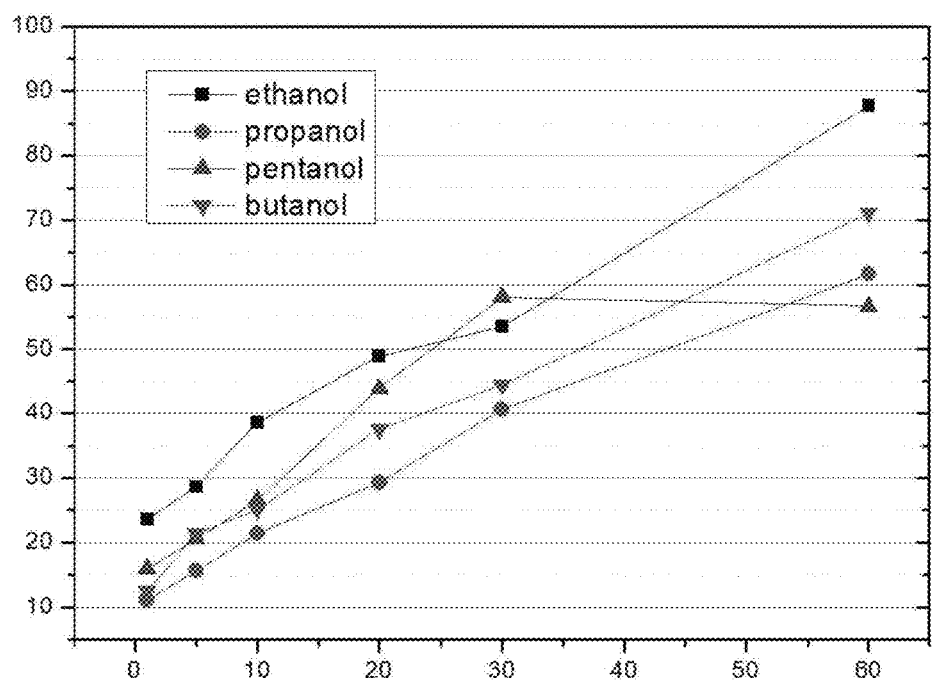
FIGS. 10 and 11 show the measurement results of the penetration depth of a hydrophilic solution of the catalytically active material in different solvents into the catalyst support as a function of time.
Figure 11:
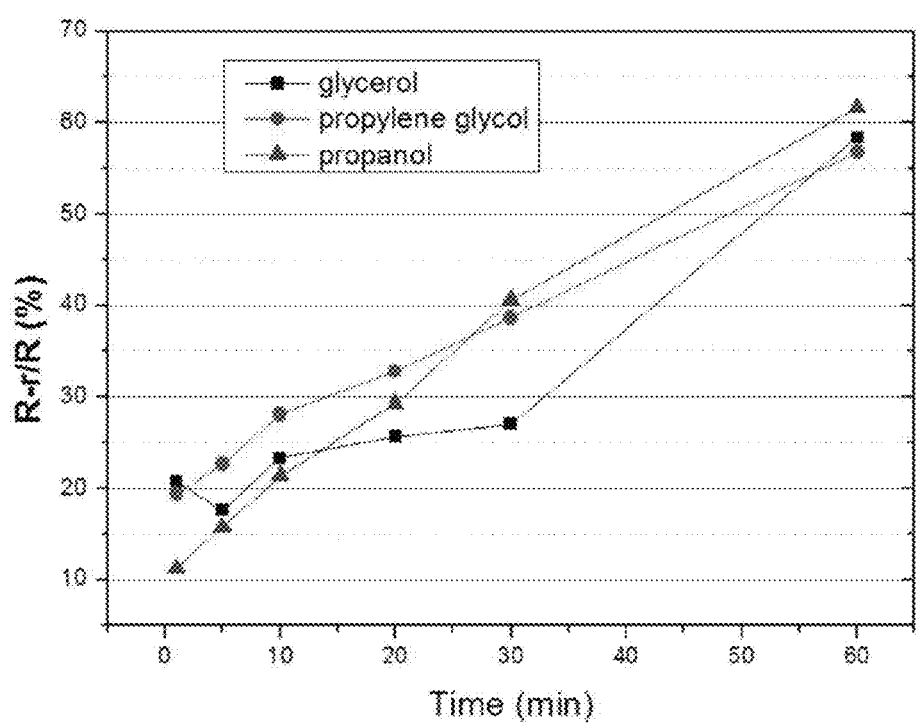

FIG. 10 shows the observation results of the case that the hydrophobic solvent is ethanol, propanol, butanol, or pentanol, and FIG. 11 shows the results of the case that the hydrophobic solvent is propanol, propylene glycol, or glycerol. In each case, the penetration depth of the catalytically active material as a function of the immersion conditions (i.e., the second immersion time, x-axis) is observed. The results are presented in FIGS. 10 and 11, where the value on the y-axis is obtained by the ratio between (R-r) over R. The radius "r" is defined as a radius of the region into which the catalytically active materials does not penetrate. The radius "R" is the radius of catalyst support particle.

The results of FIG. 10 represent the degree of penetration for the aqueous solution as a function of the number of carbon atoms in the hydrophobic solvent and the immersion time, where the hydrophobic solvent is ethanol, propanol, butanol, or pentanol. It can be seen that the degree of diffusion of the hydrophobic aqueous solution containing the catalytically active material into the catalyst support is variable depending on the type of the hydrophobic solvent.

This means that the degree of diffusion of the hydrophobic aqueous solution containing the catalytically active material into the catalyst support can be controlled by properly selecting the second immersion time and the type of the hydrophobic solvent.

FIG. 11 shows the observation results for the degree of penetration of the hydrophilic solution as a function of the number of hydroxyl groups (—OH) in the hydrophobic solvent when the hydrophobic solvent is propanol, propylene glycol, or glycerol. It is shown that the hydrophobic solvent can have a greater effect of preventing the penetration of the hydrophilic solvent with an increase in the immersion time of the hydrophilic solution containing the catalytically active material and in the number of hydroxyl groups (—OH) in the hydrophobic solvent. It is also shown that with an increase in the number of hydroxyl groups (—OH) in the hydrophobic solvent, the hydrophobic solvent has a higher viscosity and takes more time in filling the pores of the catalyst particle.

The experimental results of FIGS. 10 and 11 present the degree of penetration of the hydrophilic solution containing the catalytically active material into the catalyst particle according to the conditions of the hydrophobic solvent. Taking the degree of penetration of the hydrophilic solvent and the viscosity of the hydrophobic solvent into consideration, it is most efficient to prevent the penetration of the hydrophilic solvent when using propanol as the hydrophobic solvent.

It is therefore possible to selectively support the catalytically active material or the precursor of the catalytically active material only in a specific region of the catalyst particle with different thicknesses or different penetration depths by properly controlling the type of the hydrophobic solvent and the contact time in the first immersion time.

The method of the preset invention has an effect to reduce the used amount of the catalytically active material such as a noble metal and lower the production cost of the catalyst by supporting or impregnating the catalytically active material, such as platinum, ruthenium, rhodium, cobalt, nickel, etc., that takes a large part of the production cost of the catalyst, selectively only on the surface of the catalyst support.

In addition, the use of the present invention can support or impregnate various catalysis selectively in a specific region in the pores of the catalyst support in the radius direction, thereby making it possible to realize a design of an economical complex catalyst and a large-scale production of the catalyst.

More specifically, in such a reaction as a steam methane reforming reaction or a water-gas shift reaction that is earned out under reaction conditions requiring a high space velocity, only the surface part of the catalyst particle is used, but the inner part of the catalyst particle is not available in use. However, the catalyst prepared by the preparation method of the present invention can achieve an equivalent level of conversion rate and selectivity to the conventional catalysts even though a relatively small amount of the catalytically active material is supported in the catalyst.

In particular, when using a catalyst prepared by a general impregnation method using the Fischer-Tropsch reaction and a catalyst particle having a particle size of 1 to 3 mm to have the catalytically active material supported or impregnated on the entire region of the particle, the diffusion of a reactant, CO, is restricted to reduce the production rate and the selectivity of the hydrocarbon having at least 5 carbon atoms. However, the use of the catalyst prepared by the method of the present invention can overcome the above-mentioned problem and thus remarkably enhance the efficiency of the Fischer-Tropsch reaction.

What is claimed is:

1. A selective surface supporting method for catalytically active materials using a repulsive force between a hydrophilic solvent and a hydrophobic solvent, the method consisting of:
a catalyst support preparation step S10 of preparing a spherical or cylindrical porous inorganic oxide as a catalyst support;
a first immersion step S100 of immersing the catalyst support in a hydrophobic, first solvent to fill in surface pores and inner pores of the catalyst support with the hydrophobic, first solvent;
a first drying step S200 of performing a drying process to eliminate the hydrophobic, first solvent from the inner pores under the surface of the catalyst support, thus allowing the hydrophobic, first solvent to remain in the pores in an inner central region of the catalyst support;
a second immersion step S300 of dissolving catalytically active materials or a precursor of the catalytically active material in a hydrophilic, second solvent to prepare a hydrophilic solution and then immersing the catalyst support from the first drying step in the hydrophilic solution;
a second drying step S400 of eliminating the first solvent and the hydrophilic, second solvent of the hydrophilic solution remaining in the catalyst support; and a supporting or impregnation step S500 of performing a calcination process to form the catalyst material or the precursor of the catalyst material selectively in the surface region of the catalyst support and in the inner pore region under the surface of the catalyst support,
wherein the hydrophobic, first solvent is at least one selected from the group consisting of n-propanol, n-butanol, n-pentanol, and n-hexanol,
wherein a drying temperature in the first drying step is selected in the range from the boiling temperature of the hydrophobic, first solvent minus 50° C. to the boiling temperature of the hydrophobic, first solvent plus 50° C.,
wherein a drying time in the first drying step is selected in the range of 1 to 120 minutes,
wherein the first drying step includes eliminating the hydrophobic, first solvent on the surface of the catalyst support and the hydrophobic, first solvent filled in the inner pores in the outer part of the catalyst support in the range of one fifth or one half of the distance from the surface of the catalyst support to the center of the catalyst support, and
wherein the first immersion step includes performing sonication to fill the inner pores of the catalyst support particle with the hydrophobic, first solvent.

2. The selective surface supporting method for a catalyst material using a repulsive force between a hydrophilic solvent and a hydrophobic solvent as claimed in claim 1, wherein the porous inorganic oxide is at least one selected from the group consisting of silica, alumina, titania, zirconia, and cerin.

3. The selective surface supporting method for a catalyst material using a repulsive force between a hydrophilic solvent and a hydrophobic solvent as claimed in claim 1, wherein the catalytically active material or the precursor of the catalytically active material is a metal salt of any one metal selected from platinum, ruthenium, rhodium, cobalt, nickel, or palladium, or a precursor of the metal salt.

4. The selective surface supporting method for a catalyst material using a repulsive force between a hydrophilic solvent and a hydrophobic solvent as claimed in claim 1, wherein the second immersion step includes filling the hydrophilic solution in a surface region of the catalyst support and an inner pore region in the outer part of the catalyst support in the range of one fifth to one half of the distance from the surface of the catalyst support to the center of the catalyst support as removed of the hydrophobic, first solvent through the first drying step.

5. The selective surface supporting method for a catalyst material using a repulsive force between a hydrophilic solvent and a hydrophobic solvent as claimed in claim 1,
wherein the hydrophilic, second solvent is water,
wherein the hydrophilic solvent is an aqueous solution of the catalytically active material or an aqueous solution of the precursor of the catalytically active material.

6. The selective surface supporting method for a catalyst material using a repulsive force between a hydrophilic solvent and a hydrophobic solvent as claimed in claim 1, wherein the immersing time in the second immersion step is in the range of 1 to 60 minutes.

* * * * *